Nov. 12, 1940.  L. C. RATHBUN  2,221,108
SOLDERING DEVICE
Filed May 20, 1939
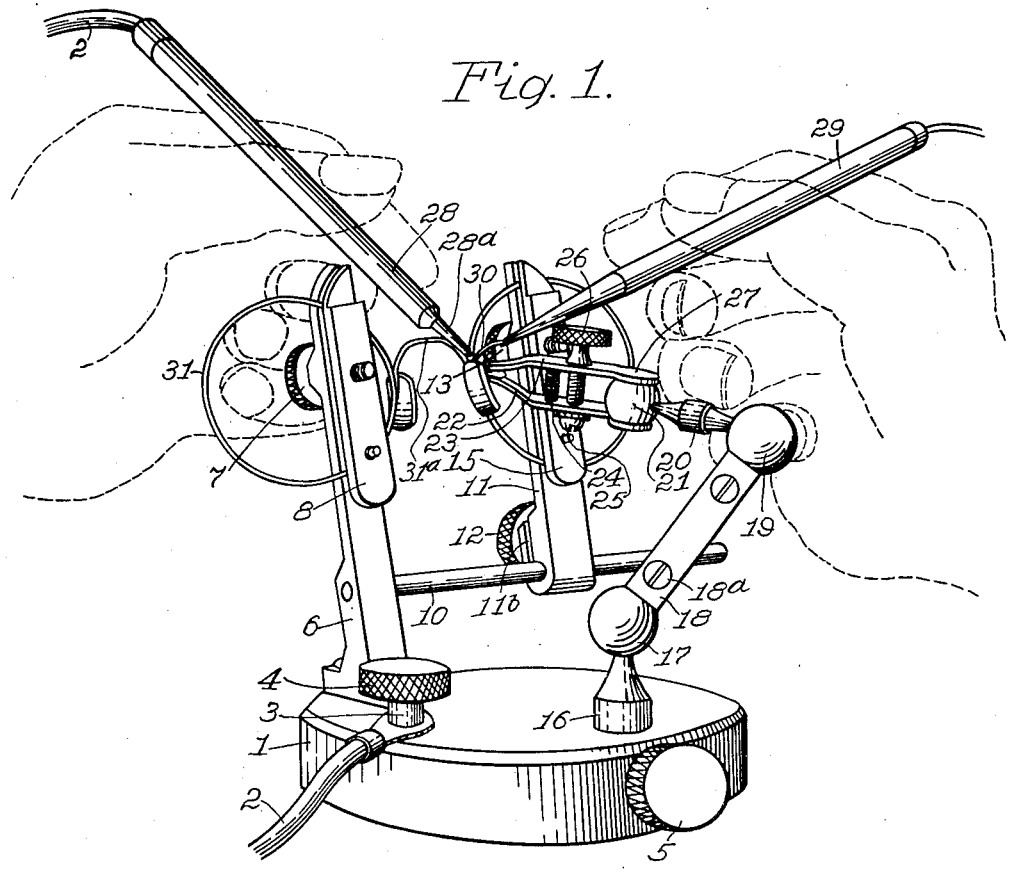
Fig. 1.
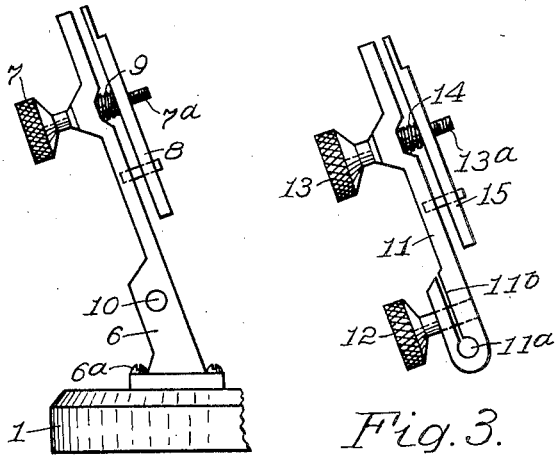
Fig. 2.
Fig. 3.
Inventor
Louis C. Rathbun,
By  G. C. Kennedy.
Attorney Patented Nov. 12, 1940

2,221,108

UNITED STATES PATENT OFFICE 2,221,108

SOLDERING DEVICE

Louis C. Rathbun, Oelwein, Iowa

Application May 20, 1939, Serial No. 274,800

1 Claim. (Cl. 113—104)

My invention relates to improvements in soldering devices, and the principal object of my invention is to provide for jewelers and others a convenient adjustable means for electric soldering purposes, particularly for uniting small objects or broken elements thereof, and effectively constructed with secure clamping means for the objects treated.

Another object of my improvements is to include devices for use by both hands in treating the parts to be united without having to manipulate the clamping means during the operation.

These objects I have accomplished in actual construction and successful employment of the device.

The invention is illustrated in the accompanying drawing, described in the specification and duly claimed herein.

Fig. 1 is a perspective view of my improved soldering device as being used in soldering parts of a broken article, the dotted lines indicating the positions of the hands of the operator while in the process of soldering, with portions of the electric conductors broken away. Figs. 2 and 3 are respectively elevations of the clamping devices only and at one side thereof apart from other coacting devices of the invention.

On the rear part of the base member 1 are positioned the associated pair of similar clamping means 8 and 15 shown in transverse alinement and with one clamping device mounted adjustably on the other. One clamping device has an upwardly directed rearwardly tilted fixed standard 6, having a horizontal shaft 10 with one end fixed thereon to project transversely above the member 1. As shown in said Fig. 2, the upper portion of the standard 6 is traversed by a threaded stem having a knurled head 7 in the rear, and a relatively short adjustable clamp 8 is traversed by said stem, with a short coiled spring 9 mounted on the stem between the members 6 and 8.

The other clamping device (Fig. 3) in its upper parts is a duplicate of the first device, having a shorter standard 11 also inclined rearwardly with a headed screw 13 traversing the parts 11 and 15 forwardly with a like coiled spring 14 between them to maintain them in parallel alinement. The lower end part of the standard 11 is thickened rearwardly and slitted from above at 11b, and at the bottom of the slit is widened to be fitted in and to traverse the standard and be clamped on the horizontal shaft 10. A rearwardly headed screw 12 traverses the slitted lower part of the standard 11 above the shaft 10 and releasably clamping the standard on the shaft when adjusted therealong. The standard 11 may also be tilted forwardly or rearwardly as desired in supporting the body to be treated.

Opposite forwardly from the pair of standards 6 and 11 is a stud 16 seated movably in a socket in the base 1 and secured adjustably by a set screw 5. An arm 18, sectional, is in its elements connected by screws 18a, and has a ball joint at 17 with the stud 16. The opposite end part of the arm 18 has a ball joint at 19 to a stem 20. The numerals 22 and 23 denote a pair of forwardly converging and diminished pincers with their opposite ends widened to embrace opposite sides at 27 of a ball joint 21 on the stem 20. The pincers are medially connected adjustably by a traversing screw 25. A coiled compression spring 24 is engaged between the arms 22 and 23 forwardly of the screw 25. A cap nut 26 is fitted on the outer end of the screw 25 to adjust the spacing of the arms 22 and 23. By the above means a compound arm is produced, freely jointed for swinging adjustments.

In Fig. 1 a spectacle frame 31 has metal rims and an arched nosepiece 31a one end of which is broken away from the right hand rim. The rims are clamped in proper alinement and association between the clamping means 6—8 and 11—15 respectively, as the latter clamps 11—15 are adjusted suitably along the shaft 10. When the end parts of the nose piece are in contact, the operator has both hands free to use the handles 28 and 29 in effecting the soldering process. The terminal part of the solder wire 30 being contacted with the apposed broken parts, and the terminal 28a applied to the solder, the latter melts to close the joint.

I claim:

A soldering device, comprising in combination, a base member, an upwardly directed standard fixed thereon and having a lateral arm mounted thereon, a second standard having its lower end apertured and slidably mounted on the lateral arm, and also split upwardly for a distance, a screw adjustably connecting the standard and said split part to hold the standard releasably and adjustably along the lateral arm, like clip-bars adjustably resiliently mounted along the forward faces of both standards, and a third standard device mounted on the base member forwardly opposite said first and second standards and consisting of a standard, a plurality of arm members connected respectively to each other and the third standard by universal joints, the free terminal member thereof being a pair of pincers adjustably connected together, and resilient spacing means between the pincers.

LOUIS C. RATHBUN.